Sept. 4, 1956
B. WALTERS
2,761,177
MANUFACTURE OF ORNAMENTAL AND DISPLAY PLASTIC SHEETS
Filed April 20, 1955
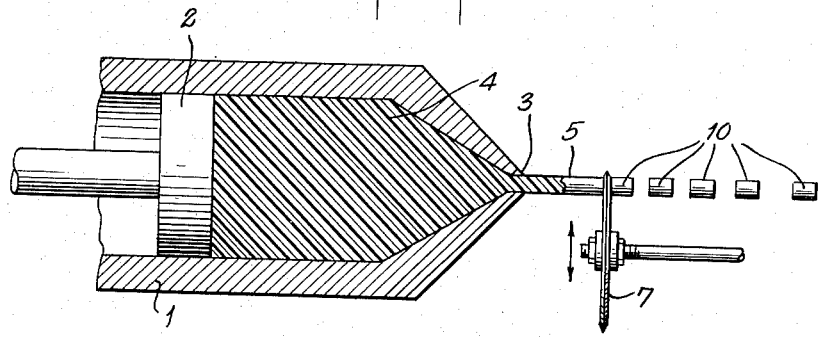
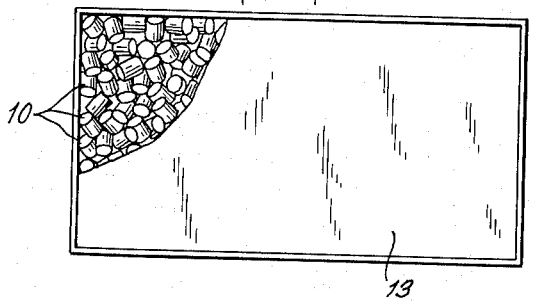
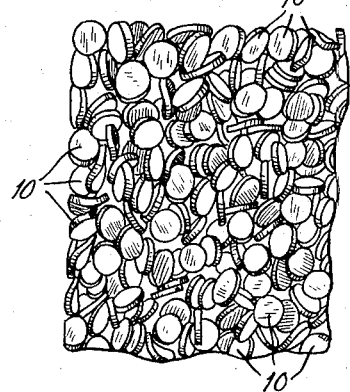
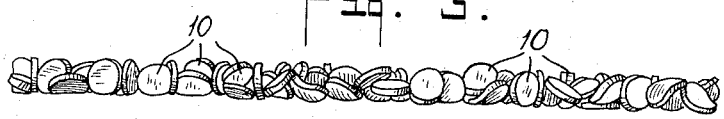
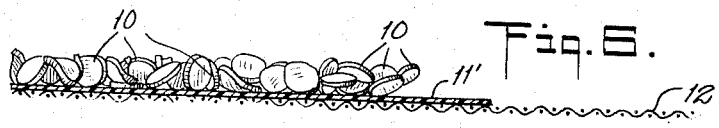
INVENTOR.
BEN WALTERS
BY
Roger Williams
ATTORNEY

United States Patent Office 2,761,177
Patented Sept. 4, 1956

2,761,177

MANUFACTURE OF ORNAMENTAL AND DISPLAY PLASTIC SHEETS

Ben Walters, New York, N. Y.

Application April 20, 1955, Serial No. 502,628

7 Claims. (Cl. 18—48)

The present invention relates to methods of manufacturing ornamental or display sheets formed of plastic materials, having an openwork structure and presenting a relatively great number of projections at an angle to the flat dimensions of the sheet proper.

This application is a continuation-in-part of my previous applications Serial Number 352,857, filed May 4, 1953, and Serial Number 474,160, filed December 9, 1954, now abandoned.

It has already been proposed to place granules of plastic material in contact with one another in a layer and then to apply heat until the portions of adjacent and contacting granules which become softened by the heat, completely or partially fuse together, so as to form respectively a solid sheet or a sheet displaying interstices, due to the fact that there exist spaces in some directions between adjacent granules.

In the case of the formation of solid sheets it is of course always possible to make certain of a sufficient thickness of the layer of granules, and in this case the heating is usually carried to the point where the granules not only soften, but display some amount of fluid flow.

In the case of the porous type sheets it has been found necessary to arrange the layer of granules of plastic with great care. If the layer should be too thick at any point, the resultant sheet will display irregular bulges in thickness. If on the other hand the layer should be too thin at any point, there are apt to be relatively large and unwanted holes in the finished sheet.

The present invention discloses a process which enables the layer of plastic granules to be formed with great rapidity and without the need of great care as to obtaining a uniform thickness thereof before fusing the granules together. The resultant sheet will have an average thickness not subject to excessive variation and furthermore will display a relatively large number of granules which are oriented more or less upwardly from the plane of the sheet as a whole. This type of orientation yields an especially attractive appearance to the finished article.

The special phenomenon which is taken advantage of by the method of the instant invention is that termed plastic memory. Instead of depending upon manual skill in distributing the granules in a layer of uniform thickness prior to heating, what is accomplished is that during the actual heating of the layer, each individual granule will, per se, move or expand in the direction in which it is impelled by plastic memory, so that it encounters the minimum resistance to such motion. If the granule finds open space beside it, it may simply move or expand so as to tend to occupy such space. If it can slide up over a portion of an adjacent granule, it may do so. If on the other hand the direction in which it tends to move or expand is at an angle to the plane of the sheet, it may project upwardly therefrom. The reason that it would not tend to project downwardly is that the layer must of necessity rest upon something of a relatively unyielding nature, for example a metal sheet, pan or already formed solid plastic sheet.

One object of this invention is to expedite the manufacture of plastic sheets of the nature just described by permitting granules before heating to be formed into a layer with the expenditure of much less time and effort than have hitherto been found needful.

A further object of the present invention is to take advantage of plastic memory so as to cause individual granules of unfused plastic to adjust themselves by movements in directions where the greatest tendency or least resistance is encountered, such movements taking place without the application to the granules of any external force, but being determined by the intra-molecular forces arising from stains and stresses frozen into the plastic at the time the granules are originally solidified and now being permited to display themselves by the application of heat to the plastic.

Still another object of this invention is to provide a method whereby a finished sheet formed of plastic granules will present relatively great porosity throughout, but yet will have one surface substantially devoid of projecting particles, while the opposite side will display a large number of such projecting particles.

Yet a further object of this invention is to produce sheets of the form just described, wherein diverse colors of individual particles of plastic are used, which may be arranged in some definite design so that patterns in color will be exhibited by the finished sheet.

In the foregoing descriptions, when heat or fusing is mentioned, it is distinctly to be understood that the heat is never applied to such a high degree or for a length of time sufficient to cause the individual granules completely to lose their original shapes, although the sizes do alter. Thereby a selection of differing shaped original granules allows the manufacture of finished sheets which will have distinctive appearances, according to the particular shape of the granules employed in manufacturing the several sheets.

In order more easily to understand the present invention reference is now made to the drawings hereunto appended.

Figure 1 is a sectional elevation of an arrangement for preparing plastic pellets or granules so as to display plastic memory.

Figure 2 is a plan view of a tray of prepared pellets before heating.

Figure 3 is a cross-sectional elevation of a mass of pellets after heating and removal from the support.

Figure 4 is a plan view of a panel or sheet of completed plastic materials formed by this process.

Figure 5 is a cross-sectional elevation of the composite structure formed by heating the pellets on a sheet of solid plastic.

Figure 6 is a cross-sectional elevation of a similar structure formed on paper or cloth.

In Figure 1 a hollow cylinder, provided with a piston 2, is filled on one side of the piston with plastic 4, maintained in fluid or semi-fluid state by any one of the means familiar in the art of plastics, for example by supplying to the cylinder 1 a suitable degree of heat.

At the nearly closed end of cylinder 1, is provided a relatively small orifice 3, through which the fluid or semi-fluid plastic is expelled under stress, by reason of the pressure exerted by piston 2 upon the mass within the cylinder, as a rod 5.

As the plastic leaves orifice 3 it immediately hardens, due to the lower temperature encountered without the body of the cylinder. A suitable cutting device, for example the cutting wheel, mounted upon shaft 7 and driven from a suitable source of power (not shown) acts to sever the plastic rod being protruded into small pellets 10, the length of which can of course be determined by adjustment of the frequency with which the cutter is applied, relative to the speed of protrusion of the plastic rod.

The first step of the present invention produces individual pieces of plastic which, being severed from the parent rod without the use of heat, present within themselves the same stresses present in the rod, as extruded. Since the rod hardens just as it emerges through orifice 3, which often is tapered internally, it is given no chance to eliminate internal strains by slowly cooling. On the contrary, the extruded rod keeps such strong internal stresses that upon later application of heat thereto it will tend to eliminate the strains at this later time, by changing the dimensions thereof. In practice it has been found that this particular species of plastic memory usually causes the individuals pellets or granules to expand particularly in a direction at right angles to the axis along which they were extruded and to shrink in the other direction. The preferred form of the pellets is some geometrical shape displaying at least one major axis, longer than at least one minor axis. However, equal axes can be used. Flattened discs or flat-faced three dimensional forms such as parallelepipeds are among the suitable shapes of the pellets but any other convenient shape can be used, such as stars, triangles, etc. However it is to be understood that this invention is not liimted to any one form of pellet, since the essence lies in the use of almost any pellet which may be produced under conditions which will impart to it the above described plastic memory. Likewise holes or depressions may exist in the pellets without altering the method of this invention.

In Fig. 2 these pellets 10 are to be seen spread in a layer in a suitable tray 13, for example a tray of metal or other material, preferably one which will not warp or soften under heat. Heat is then applied to the tray of pellets by any convenient means. For example the tray may be placed within an oven and the heat applied either by conduction, convection or radiation. However the use of electrically powered radiant units suspended over the tray of plastic particles, has been found especially advantageous, although this invention is in nowise limited to this particular method of applying heat.

As to the amount of heat and the length of time for which it is applied, these two factors are influenced primarily by the particular type of plastic used. The size of the individual particles and the thickness of the layer naturally are additional determining factors. Lastly, to a limited extent there exists an inverse ration between the time and the temperature, but of course there are both lower and upper limits to each of these elements of the process. Purely by way of example, and without thereby limiting the scope of this invention, it has been found that a layer of particles of polyethylene having an average length in each dimension of about 3.2 millimeters, when spread in a layer not much thicker than the length of a single particle yields satisfactory results when heated for about five or six minutes at a temperature of about 177° C. to 204° C.

Upon removal of heat from the layer of plastic particles it will be seen that each particle 10 has expanded, chiefly in the direction at right angles to its axis of extrusion, and the finished sheet will present the appearance shown in Figures 3 and 4. Due to the mentioned expansion caused by plastic memory, the finished sheet will be more or less uniform, since such expansion will tend to fill up any large holes due to faulty formation of the layer of plastic granules before fusion thereof.

A mixture of differently colored plastic granules will yield particolored or variegated sheets.

In Fig. 5 is to be seen a solid sheet of plastic 11, on top of which the pellets 10 have been fused. This sheet 11 takes the place of the metal pan previously described and is usually preferably made of the same type of plastic as the pellets, but has not been endowed with any plastic memory, so that its passes through the re-heating process virtually unchanged. The pellets, when softened, become fused or welded to the plastic sheet 11, which then constitutes the base supporting the pellets on one side, and affording a very smooth surface upon the other side.

In Fig. 6 the base is constituted by a sheet 12 of paper, cloth, or the like, to the upper surface of which has been permanently and firmly caused to adhere a relatively thin layer of plastic 11', preferably similar to that of which the pellets 10 are formed. The composite paper-plastic sheet supports the pellets in the heating oven and the pellets become fused or welded to the plastic layer, which thus yield a three ply composite or sandwich.

While I have shown and described certain embodiments of my invention, it is to be understood that these are solely by way of example and not limitation, the scope of this invention being determined by the hereunto appended claims.

What is claimed is:

1. The process for the utilization of plastic memory so as to produce an extremely porous sheet of plastic material, including the steps of arranging pre-stressed pellets of polyethylene in a relatively thin layer, heating said layer at atmospheric pressure to a temperature not greatly above the softening point of said plastic, for a time sufficient to allow said pellets to at least partly reform under the influence of said plastic memory while remaining as individual particles, and cooling said pellets, whereby said pellets at least partly adhere to one another and are at least partly irregularly slanted upwardly at an angle to the plane of said layer, said time and said temperature being so chosen that the pellets do not melt and flow so as to lose their shape and identity.

2. The process for producing composite plastic sheets having a backing layer of solid plastic, which includes the steps according to claim 1, said layer of pellets being placed upon said solid plastic layer before heating.

3. The process for producing composite sheets having an intermediate layer of solid plastic and a backing layer of cloth, which includes the step of first preparing a firmly adherent layer of solid plastic upon a sheet of cloth and then performing the steps according to claim 1, said layer of pellets being placed upon said intermediate layer of solid plastic before heating.

4. The process for producing composite sheets having an intermediate layer of solid plastic and a backing layer of paper, which includes the step of first preparing a firmly adherent layer of solid plastic upon a sheet of paper and then performing the steps according to claim 1, said layer of pellets being placed upon said intermediate layer of solid plastic before heating.

5. The process of forming decorative sheets having a plurality of openings therethrough, including the steps of selecting granules of hardened thermoplastic polyethylene which has been formed under much greater stress in one axial dimension than in another, so as to be capable of exhibiting asymmetrical plastic memory effect, placing said granules upon a supporting flat surface of a material to which polyethylene is non-adherent when softened by heat, in a layer of which the average thickness is not greatly in excess of the average maximum linear dimension of the respective granules, heating to between 177° C. and 204° C. said layer of granules under pressure not in excess of atmospheric and while leaving the granules free to move, until said granules change their ratio of length to width under the impulse of plastic memory, and to soften where they are forced into contact with one another because of said change of relative dimensions, so as to adhere in part to one another while the granules remain visibly distinct from one another, and cooling the so-produced highly porous sheet until the granules are again hardened, but with substantially all the stress due to plastic memory removed therefrom, whereby the enlargement of some of the granules in a direction at an angle to the two dimensions of the sheet, causes them to protrude in the third dimension, and the average thickness of the finished sheet is substantially in excess of the thickness of said layer before heating.

6. The process according to claim 5, in which the selected pellets before heating are longer in one dimension than in a dimension normal thereto in a predetermined ratio, and after heating the ratio of length in the respective dimensions is altered.

7. The process according to claim 1, wherein the layer of granules, is partly restained from horizontal expansion, by being placed in a relatively rigid shallow pan, whereby some granules are restrained horizontally and therefore expand in at least a semi-vertical direction.

References Cited in the file of this patent

UNITED STATES PATENTS

| | | |
|---|---|---|
| 2,234,994 | Vernon et al. | Mar. 18, 1941 |
| 2,603,575 | Schramm | July 15, 1952 |
| 2,649,618 | Rhodes et al. | Aug. 25, 1953 |

FOREIGN PATENTS

| | | |
|---|---|---|
| 646,162 | Great Britain | Nov. 15, 1950 |